(12) United States Patent
Roose (10) Patent No.: US 7,316,485 B2
(45) Date of Patent: Jan. 8, 2008

(54) FLIP-UP CONVEX MIRROR ATTACHMENT

(76) Inventor: Alison L. Roose, 5673 Michigan Rd., Plymouth, IN (US) 46563

(*) Notice: Subject to any disclaimer, the term of this patent is extended or adjusted under 35 U.S.C. 154(b) by 0 days.

(21) Appl. No.: 11/508,639

(22) Filed: Aug. 22, 2006

(65) Prior Publication Data
US 2007/0047115 A1    Mar. 1, 2007

Related U.S. Application Data (60) Provisional application No. 60/710,851, filed on Aug. 24, 2005.

(51) Int. Cl.
*G02B 5/08*    (2006.01)
*G02B 7/18*    (2006.01)
(52) U.S. Cl. .................... 359/844; 359/872
(58) Field of Classification Search ............ 359/844, 359/868, 872
See application file for complete search history.

(56) References Cited

U.S. PATENT DOCUMENTS

| | | |
|---|---|---|
| 2,605,676 A | 8/1952 | Couch |
| 3,667,833 A | 6/1972 | Baldwin, Sr. |
| 4,486,075 A | 12/1984 | Cohen |
| 4,793,701 A | 12/1988 | Brown |
| 4,927,255 A | 5/1990 | Martinez |
| 4,934,802 A | 6/1990 | Fluharty et al. |
| 5,165,081 A | 11/1992 | Drumheller |
| 5,210,652 A | 5/1993 | Perkinson |
| 5,517,367 A * | 5/1996 | Kim et al. ............... 359/864 |
| 5,557,467 A | 9/1996 | McColgan et al. |
| 5,691,855 A | 11/1997 | Lupkas |
| 5,940,229 A | 8/1999 | Baumgarten |
| 6,132,051 A | 10/2000 | Morell et al. |
| 6,286,966 B1 | 9/2001 | Mandair et al. |
| 2003/0117728 A1 | 6/2003 | Hutzel et al. |
| 2005/0219723 A1 | 10/2005 | Liang |

* cited by examiner

*Primary Examiner*—Alessandro Amari
(74) *Attorney, Agent, or Firm*—Michael A. Bergeron (57) ABSTRACT

A flip-up convex mirror attachment for installation onto the original equipment mirror in vehicles with either a left-side or right-side driver. The flip-up convex mirror attachment attaches to the mirror surface of the original equipment interior mirror found in most motor vehicles. The flip-up convex mirror attachment contains an angled hinge block for creating a predefined offset angle between the flip-up convex mirror and the OEM mirror such that the reflected image on the side of the mirror nearest the driver is maintained at generally the same point behind the vehicle as the original equipment mirror. The wedge-based hinge assembly may be attached to the flat mirror surface on either a left-side or right-side driver vehicle and still maintain the desired angular offset between the OEM and flip-up convex mirrors.

10 Claims, 10 Drawing Sheets

FLIP-UP CONVEX MIRROR ATTACHMENT

CROSS-REFERENCES TO RELATED APPLICATIONS

This application claims prior art from U.S. Provisional Patent application No. 60/710,851 filed Aug. 24, 2005 by Alison L. Roose entitled FLIP-UP CONVEX MIRROR ATTACHMENT the entirety of which is hereby incorporated by reference.

FIELD OF INVENTION

The present invention relates to an apparatus for a flip-up convex mirror for attachment to a motor vehicle's original equipment manufacturer (OEM) interior rear view mirror. The flip-up convex mirror attachment apparatus further provides a means for maintaining one side of the reflected image constant as the OEM mirror or flip-up convex mirrors are used without the need for the driver to adjust the mirror assembly. The apparatus further provides a means for the convex mirror to be easily operated and positioned into either the down or up position; thereby allowing the driver to select the desired reflected view based upon the driving situation and to utilize the custom features that are now embedded in original equipment mirrors.

BACKGROUND OF THE INVENTION

The advantages of using a convex mirror while operating a motor vehicle is widely known within the industry and among motor vehicle operators. A study by the Ford Motor Company resulted in the National Highway Traffic Safety Administration (NHTSA) amending its standards to allow the use of convex mirrors on the passenger side exterior mirror for improved operator visibility while operating a motor vehicle and therefore greatly improving safety. After more than 20 years of experience with these convex mirrors, the NHTSA now feels that drivers are very familiar with the benefits of using a convex mirror and these drivers have the ability to adapt to the changes in depth perception created with a convex mirror.

However, the NHTSA has not adopted changes in the motor vehicle standards to allow for customer delivery of a motor vehicle with an interior convex mirror. The NHTSA standard continues to require a unit magnification mirror with at least 20 degrees of visibility to the rear of the vehicle.

A number of aftermarket convex mirrors and retrofit convex mirrors are available for purchase by the vehicle owner for modification of their motor vehicle's interior rear view mirror. These aftermarket rear view mirrors provide a convex mirror or a combination of flat and convex mirror surfaces for use by the vehicle operator. Some units are sold as replacement interior mirrors; while others are sold to retrofit onto the vehicle's existing mirror by clipping over the entire mirror frame. When these aftermarket convex mirrors are used, they prevent the operator from using the original equipment rear view mirror by either replacing the mirror or covering the entire mirror. This is an inconvenience to the vehicle owner in additional costs and loss of functionality of specialty features now common in OEM mirrors and mirror frames.

As conveniences and features are added to motor vehicles, they compete for visibility by the vehicle's driver or operator. Some of these features have resorted to displaying their information within the mirror surface or around the perimeter of the interior rear view mirror frame 32. These conveniences and features include such devices as temperature displays, compass direction, caller ID information received from cell-phones, and monitor display for rear mounted cameras. Other conveniences and features have been added to the frame around the interior rear view mirror. These conveniences and features include such devices as map lights and switches, emergency satellite call buttons, auto-dimming sensors, temperature sensors, ambient light sensors, remote control actuator buttons, and other specialty features offered by the vehicle manufacturer for specific models.

Another common aspect of modern vehicle rear view mirrors is the auto-dimming feature. The auto-dimming feature is used during nighttime driving and automatically adjusts the amount of reflected light transmitted by the rear view mirror from the vehicle headlights 39 behind the vehicle to the driver. This auto-dimming prevents night blinding the driver by bright headlamps shining from following vehicles. The auto-dimming feature has replaced the older style prismatic mirrors. The prismatic rear view mirror required the driver to manually switch the mirror between a normal view and a nighttime view.

While some manufacturers have attempted to solve the problem of inadequate driver visibility from the interior rear view mirror by combining a flat mirror and a convex mirror, these products are defective because they replace the original equipment mirror or prevent the OEM flat mirror from being used by the driver. One such product is shown in U.S. Pat. No. 5,517,367 entitled Rear View Mirror For Automotive Vehicle by Kim et. al. describes a universally mounted rear view mirror that combines a flat and convex mirror and allows the convex mirror to be rotated into a use and non-use position. While this device may be useful, it is inadequate for attaching to the original equipment mirror and forces the consumer to replace the entire mirror assembly and forego the specialty features available in the OEM mirror assembly. Its use is also limited to vehicles with a left-side driver.

There exists a need for a rear view mirror that reflects a wide-angle view behind a motor vehicle that can be easily attached to the original equipment mirror and can be easily and quickly moved between the in-use and non-use positions by the vehicle operator based on their needs and driving preferences.

There exists a need for a rear view mirror that reflects a wide-angle view behind a motor vehicle that can be easily attached to the original equipment mirror and be easily and quickly moved between the in-use and non-use positions by the vehicle operator based on the need to use features located within the OEM mirror area or around the OEM mirror frame.

There exists a need to eliminate the adjustment required by the vehicle operator when switching between a wide-angle rear view mirror and a normal rear view mirror to eliminate the driver's own reflected image.

There also exists a need to maintain a consistency and commonality in the reflected rear view images when switching between a wide-angle and a normal rear view image so the motor vehicle operator may safely switch between these views and improve safe motor vehicle operation.

SUMMARY

The Flip-Up Convex Mirror Attachment solves these problems by providing a convex mirror that can be easily attached to the original equipment mirror and easily and quickly moved between the in-use and non-use positions by the vehicle operator based on needs and driving preferences.

The Flip-Up Convex Mirror Attachment offsets the convex mirror to eliminate the vehicle operator seeing their reflected image in the convex mirror. A wedge block is attached to the OEM mirror surface and has a predefined angle to offset the convex mirror to ensure the convex mirror reflects an image to the rear of the vehicle in the same horizontal plane as the normal mirror while greatly increasing the width of the reflected image.

Furthermore, the wedge block ensures a consistent view towards the rear of the vehicle is maintained of the same reflected image in both the flip-up convex mirror and OEM mirror on the side of the mirror closest to the driver. By maintaining this common reference point, the vehicle operator can safely transition between the convex and normal reflected images and utilize the mirror in the position that best serves the driving needs at any point in time.

Furthermore, the attachment between the wedge block and the back of the convex mirror may include a rotatable slide mechanism that allows the convex mirror to be hinged about the horizontal surface anywhere along the circumference of the convex mirror. This rotatable sliding mechanism allows the operator to make minor adjustments in the reflected point on the driver's side of the convex mirror to compensate for variations in vehicle designs, vehicle width, and driver placement relative to the interior rear view mirror.

DETAILED DESCRIPTION

Figure 1:
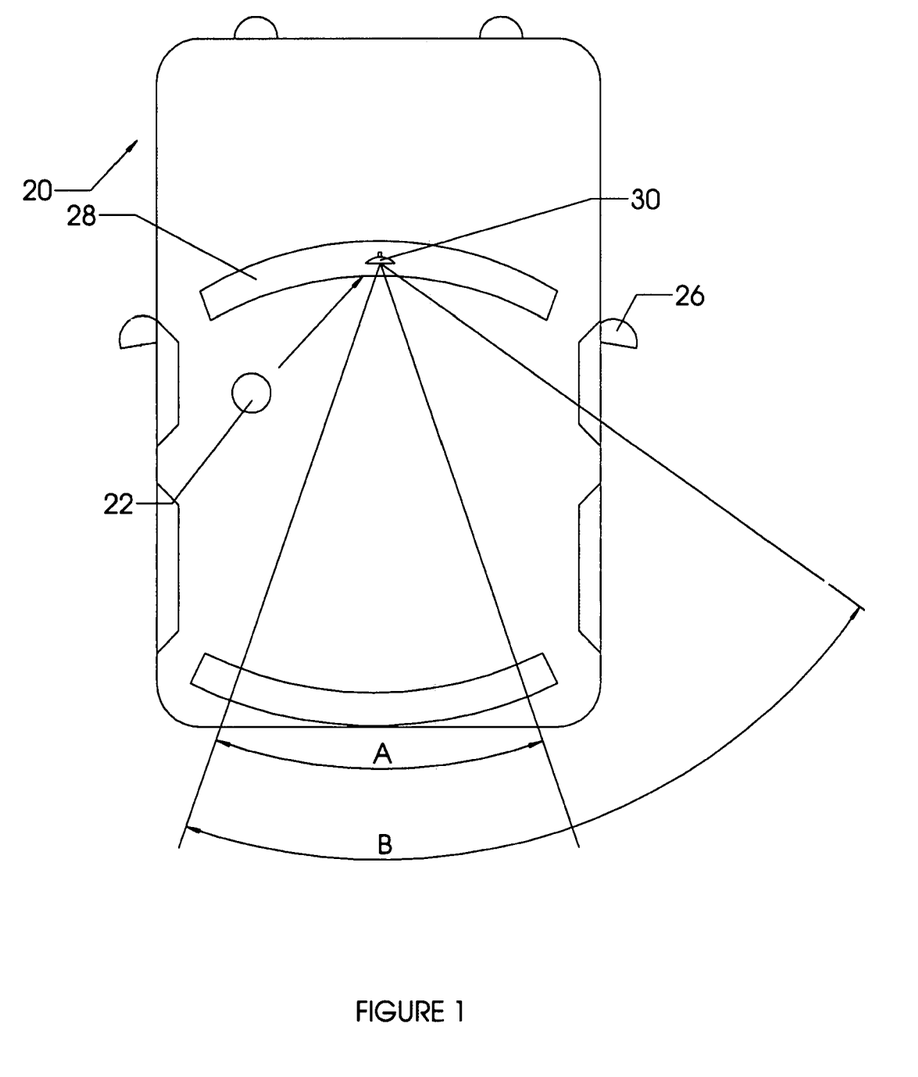
FIG. 1 is a diagrammatic plan view of an automotive vehicle having a conventional flat rear view mirror and a flip-up convex mirror attachment and further illustrating the rear view vision available from the driver's perspective using either mirror.

FIG. 1 illustrates an automotive vehicle 20 having a conventional flat rear view mirror and a flip-up convex mirror attachment 30 and further illustrating the rear view viewing angle available from the driver's perspective using either mirror. As shown in this illustration, the driver of the vehicle 22 would have a rearward view represented by angle A when using the conventional flat original equipment manufacturer (OEM) mirror. A wider-angle rearward view represented by angle B is possible when using the flip-up convex mirror attachment with the convex mirror placed in the DOWN or in-use position. This wide-angle view B would reflect images to the driver where objects would be closer than they appear; but the driver 22 is accustomed to this perspective and appreciates the wide-angle view B to gain visibility of vehicles and other objects adjacent to their vehicle without the need to significantly rotate their head to utilize the passenger side mirror 26.

By providing a wide-angle view on the interior rear view mirror, driver's with limited mobility gain a significant advantage of improved visibility while driving. They can also select to use the normal rear view mirror to better judge distances when the need arises by moving the flip-up convex mirror attachment to the UP or non-use position.

Figure 2:
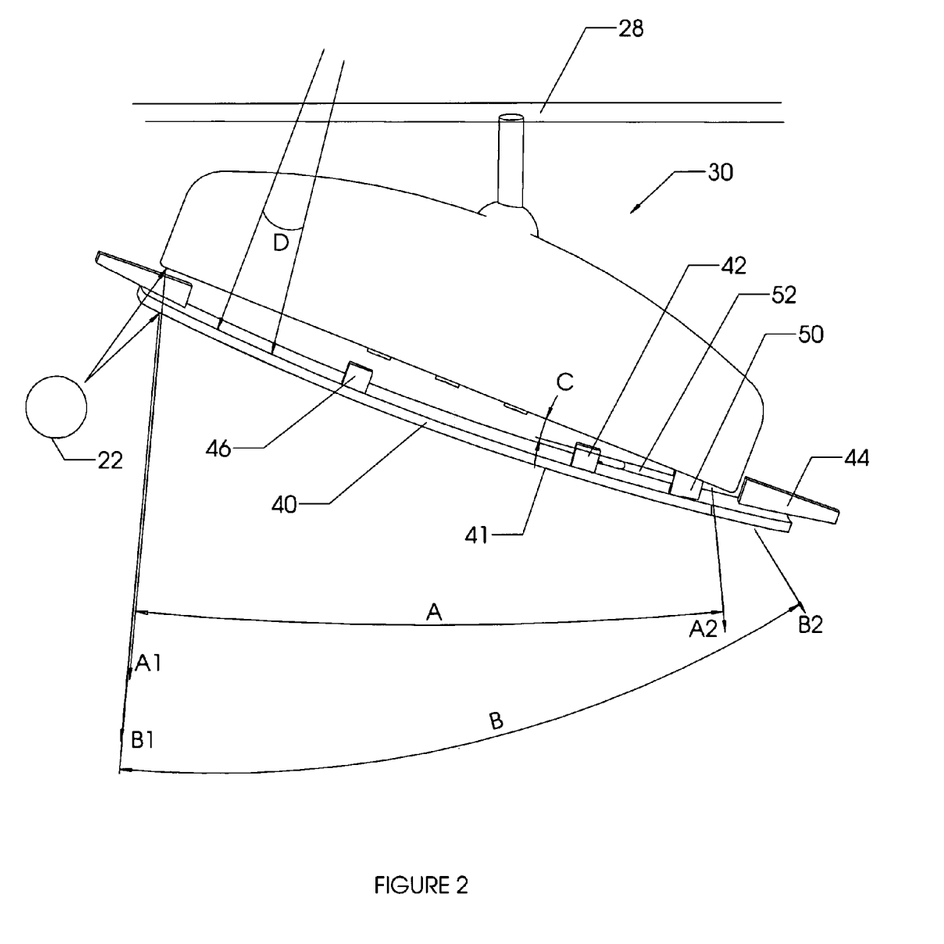
FIG. 2 is a detailed diagrammatic plan view of the drivers reflected view in an automotive vehicle having a conventional flat rear view mirror and a flip-up convex mirror attachment and further illustrating the rear view vision available from the driver's perspective using either mirror.

FIG. 2 is a detailed view illustrating the driver's 22 reflected view in an automotive vehicle having a conventional flat rear view mirror 31 and a flip-up convex mirror 40 attached to the OEM mirror 21 and further illustrating the angular rear view vision available from the driver's perspective using either mirror. It should be noted that only one mirror may be used by the driver 22 at any point in time. It should also be noted that the incident light ray angles have been distorted so that the drawing could illustrate the driver and the reflected view from either mirror surface. As shown in this figure, the driver 22 is seated on the left-side of the vehicle and would generally be seeing the same reflected image on the left side of either the OEM mirror 31 or the flip-up convex mirror 40 as noted by light ray A1 reflecting from the flat OEM mirror 31 and light ray B1 reflecting from the flip-up convex mirror 40. The width of the driver's right-side reflected image would be increased by the flip-up convex mirror 40 as shown by light ray B2 when compared to the flat OEM mirror 31 light ray A2.

The convex mirror offset angle C is defined as the angle between the flat surface of the OEM mirror 31 and the surface tangent to the convex mirror at the point of attachment of the hinge to the rear of the flip-up convex mirror required to keep the reflected angle from the driver's perspective consistent when viewing an object in either the OEM mirror 31 or the flip-up convex mirror 40 on the side of the mirror closest to the driver 22. This is best illustrated by FIG. 2 with the driver on the left side of the vehicle. The convex mirror offset angle is predefined for a typical vehicle, interior rear view mirror mounted to the vehicle windshield 28, and the driver's position on the left side of the vehicle and the convex mirror radius D. Light ray A1 represents a reflected point behind the driver and vehicle by the flat OEM mirror 31. Light ray B1 represents generally the same reflected point behind the driver and vehicle when using the flip-up convex mirror 40. When the vehicle driver location is switched to the right side of the vehicle, the convex mirror offset angle is reversed to maintain a consistent point or image on the side of the OEM or convex mirrors closest to the driver. It should be clear for a left-side driver (as in vehicles operated within the United States) that the consistent reflected image will appear in the left side of the OEM and convex mirror. When the flip-up convex mirror attachment is installed in a right-side driver vehicle, the consistent reflected image will appear in the right side of the OEM and convex mirror.

The wider-angle view B is created by using a convex mirror 40. The convex mirror 40 has a radius D in both the horizontal and vertical axis. The convex angle increases the viewing area equally in both the horizontal and vertical directions.

Continuing to refer to FIG. 2, the flip-up convex mirror 40 has two hinge sockets 42 and 46 that comprise half of a hinge positioned along the top horizontal edge of the convex mirror 40. A first end of a hinge pin 52 is snapped or inserted into either of the first hinge socket 42 or second hinge socket 46 depending on which side of the vehicle the driver sits. When the driver sits on the left side of the vehicle, the first hinge socket 42 would be used. When the driver sits on the right side of the vehicle, the second hinge socket 46 would be used. The hinge formed by the first hinge socket 42 and hinge pin 52 allow the convex mirror 40 to be rotated about the horizontal top edge of the OEM mirror. The hinge formed by the second hinge socket 46 and hinge pin 52 allow the convex mirror 40 to be rotated about the horizontal top edge of the OEM mirror.

Figure 3:
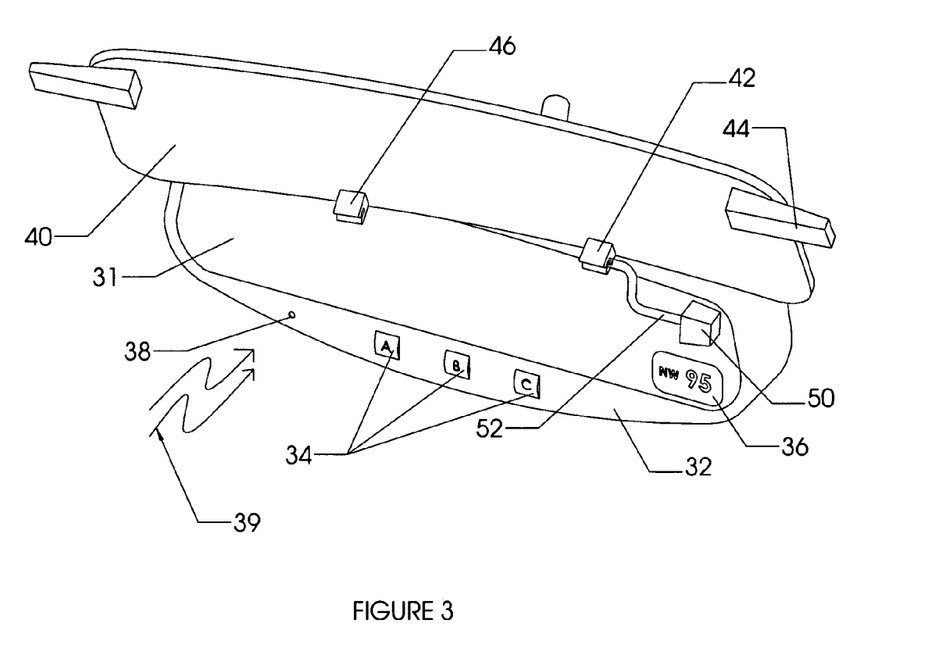
FIG. 3 is an isometric view of the flip-up convex mirror attachment when installed in a left-hand driven vehicle, the flip-up convex mirror attachment is shown with the convex mirror in the UP or non-use position.

When rotated into an UP position, as shown in FIG. 3, the driver is able to utilize the flat OEM mirror 31 for a normal view behind the vehicle. When the convex mirror 40 is rotated into the DOWN position, as shown in FIG. 2, the driver is able to utilize the convex mirror and gain a wider angle view behind the vehicle and is also able to see objects behind and to the far right side of the vehicle. The wider angle view offers the driver a significant advantage while operating a motor vehicle by increasing their visibility to the right of the vehicle with a minimum of movement by the driver. Typically, the driver would be able to view the normal or wide angle reflected image in the interior rear view OEM mirror with flip-up convex mirror attachment without the need to move their head or torso. The driver can quickly and easily move their line of sight between the roadway ahead of the vehicle and the reflect image in the interior mirror by moving their eyes only. This greatly improves the safety in operating a motor vehicle. To utilize the passenger side rear view mirror 26, the driver must move their head and/or torso. This may be difficult or impossible when the driver has limited mobility as a result of a prior injury or medical condition.

The driver is also able to easily switch between a normal view and a wide-angle view while maintaining a common reference point or image in the side of the mirror closest to them as shown by the light rays A1 and B1 shown in FIG. 2. The driver would grasp the handle 44 located on either side of the convex mirror 40 and rotate the flip-up convex mirror 40 about the hinge pin 52 into either the UP or DOWN position.

The opposing end of the hinge pin 52 is attached to a wedge block 50 such that it may not rotate. The wedge block 50 is attached to the flat OEM mirror 31 by adhesive or double-sided adhesive tape 53 using a first surface on the wedge block 50. It should be appreciated that many adhesives and tapes are available within the automotive industry for securely attaching the wedge block 50 to the glass or mirrored surface of the OEM mirror 31. The angle of attachment of the hinge pin 52 to the wedge block 50 creates an offset angle C between the hinge pin 52 and the flat OEM mirror surface 31. This offset angle is at a predefined angle such that the driver's reflected image seen on the mirror edge nearest them is duplicated in the OEM mirror 31 and the flip-up convex mirror 40. This predefined angle ensures the driver does not see their own reflected image in the convex mirror when it is in the DOWN or in-use position once the OEM mirror has been adjusted for the desired rear normal view.

Continuing to refer to FIG. 2, the flip-up convex mirror 40 is mounted at an offset angle C relative to the flat OEM mirror 31 by using a wedge block 50 attached to the OEM mirror using adhesive or double-sided adhesive tape 53, an offset pin hinge 52, and a first hinge socket 42 or second hinge socket 46 attached to the rear surface of the flip-up convex mirror 40. First hinge socket 42 is attached to the offset pin hinge 52 when the vehicle driver sits on the left-side of the vehicle. Second hinge socket 46 is attached to the offset pin hinge 52 when the vehicle driver sits on the right-side of the vehicle. It should be appreciated that many adhesives and tapes are available within the automotive industry for securely attaching the wedge block 50 to the glass or mirrored surface of the OEM mirror 31.

The driver 22 may rotate the flip-up convex mirror 40 into the UP position as shown in FIG. 3 by grasping the handle 44 and rotating the mirror to a predetermined position to allow use of the OEM specialty display 36 which is projected through a non-mirrored portion of the OEM mirror 31. As more features are included in vehicles, the original equipment manufacturer has moved these feature display functions to the interior rear view mirror. These specialty features include such displays as temperature, compass direction, time of day, caller ID phone number received from cell phones, and real-time monitor display for rear mounted cameras. By attaching the flip-up convex mirror to the OEM mirror, the driver 22 may easily switch between use of the OEM mirror 31 and the wider-angle flip-up convex mirror 40.

Figure 4:
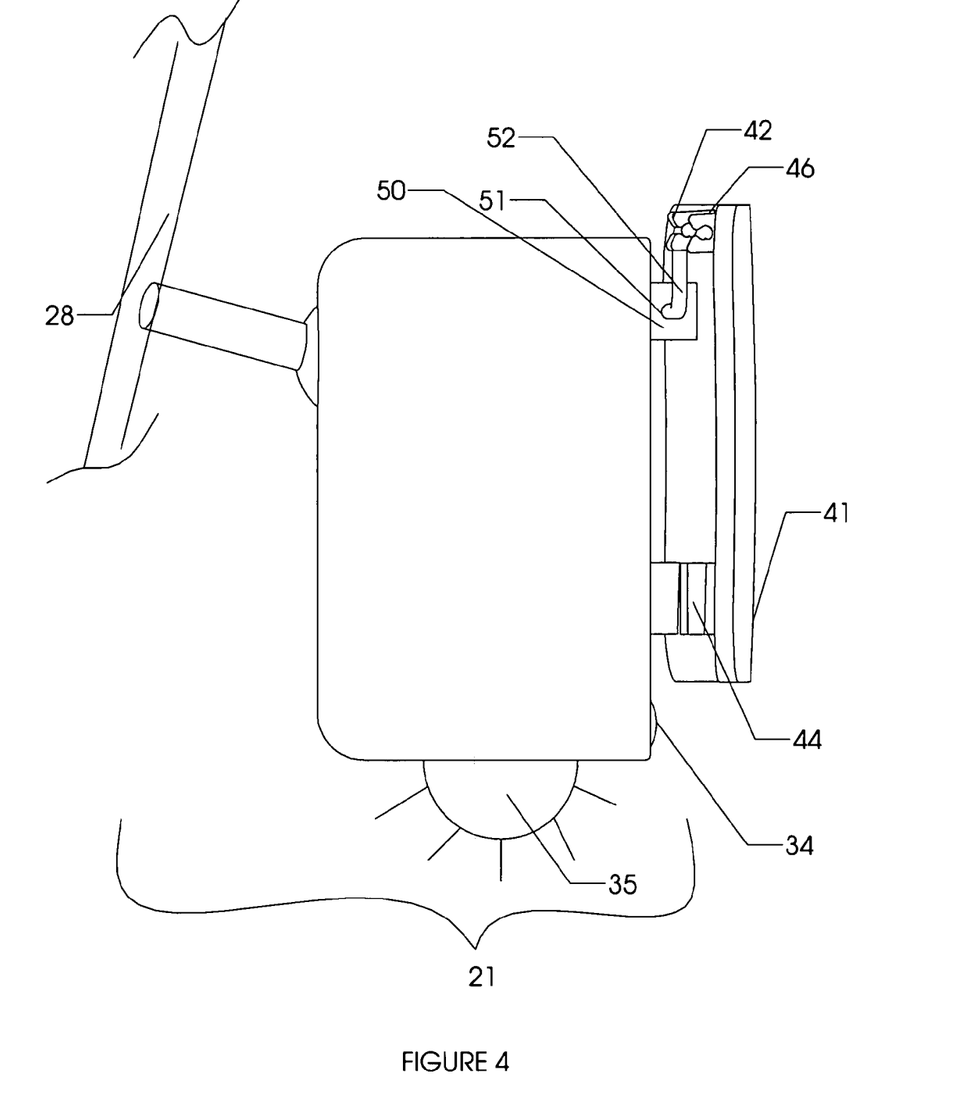
FIG. 4 is a side view of the flip-up convex mirror attachment when installed in a left-hand driven vehicle with the flip-up convex mirror in the DOWN or in-use position.

Referring now to FIG. 4, the OEM mirror specialty feature displays and buttons 34 and auto-dimming sensor 38 located on the lower edge of the OEM mirror frame may be viewed by the driver 22 with the flip-up convex mirror 40 in the DOWN or in-use position. The driver 22 can choose to operate the specialty features located within the OEM mirror frame with the flip-up convex mirror in either the UP or DOWN position.

Figure 5A:
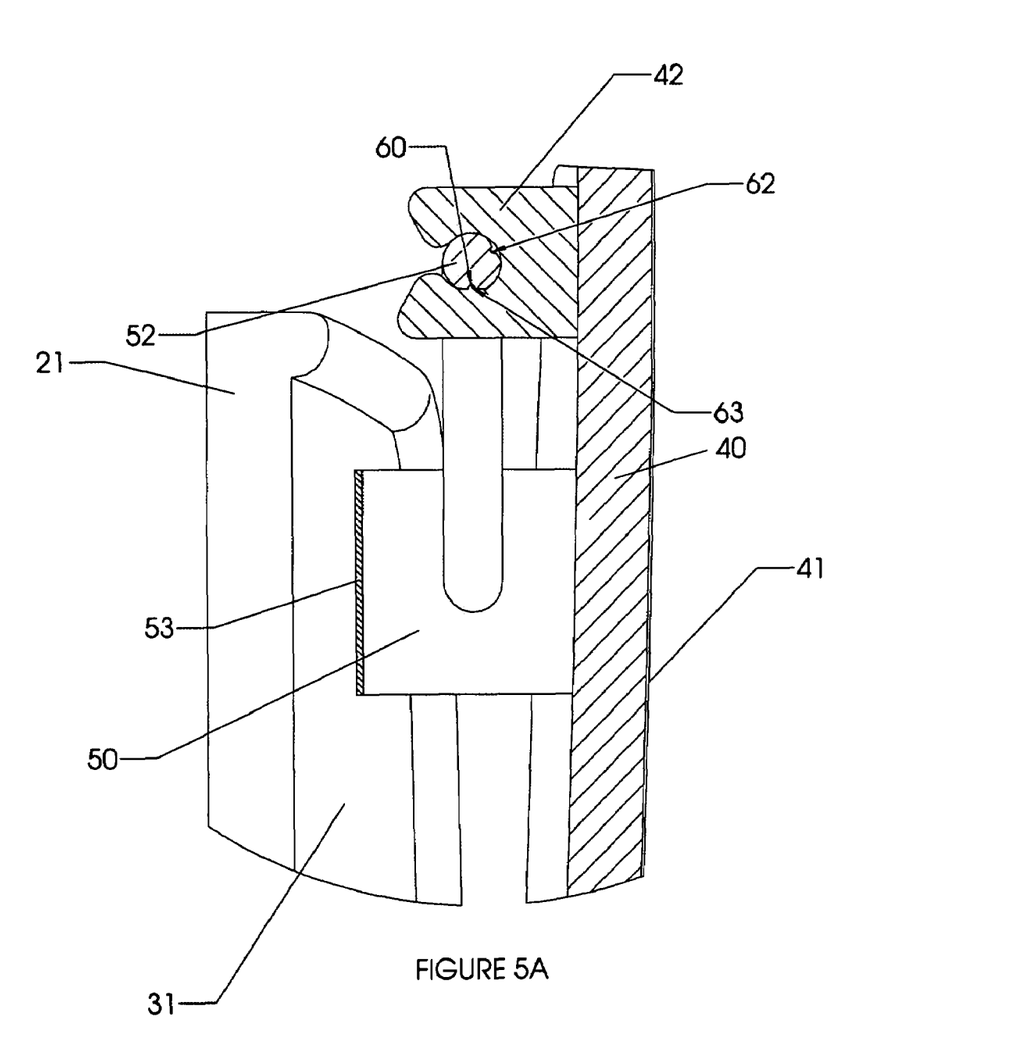
FIG. 5A is a detailed cross-sectional view of the first embodiment flip-up convex mirror attachment hinge assembly with the convex mirror in the in-use position while attached to the OEM mirror.

Referring to FIG. 5A, the wedge block 50 is shown attached to the surface of the flat OEM mirror 31 using an adhesive or double-sided tape 53. A first end of the hinge pin 52 is securely attached to the wedge block 50 while a second opposing end of the hinge pin is snapped into the first hinge socket 42 attached to the upper rear edge of the flip-up convex mirror 40. The first hinge socket 42 may be rotated about the hinge pin 52 to position the flip-up convex mirror in varying angles. However, the second end of the hinge pin 52 comprises a means to maintain the flip-up convex mirror in predefined angles corresponding to the UP or non-use position 62 and the DOWN or in-use position 60. One method of creating predefined rotational stops in shown in FIG. 5A and illustrated by stops 62 and 60. These stops 62 and 60 define the predefined positions for using the flip-up convex mirror in the UP and DOWN positions respectively. As the flip-up convex mirror 40 is rotated, the hinge socket detent 63 located on the first hinge sockets 42 snaps into the matins groove 60 or 62 located on the hinge pin 52 thereby creating a distinct stopping rotational position for the convex mirror. As the driver exerts additional force on the flip-up convex mirror, the sides of the hinge socket deflect allowing the detent 63 to disengage from the socket grooves 60 or 62 and allowing the convex mirror to be rotated about the hinge pin 52.

Figure 5B:
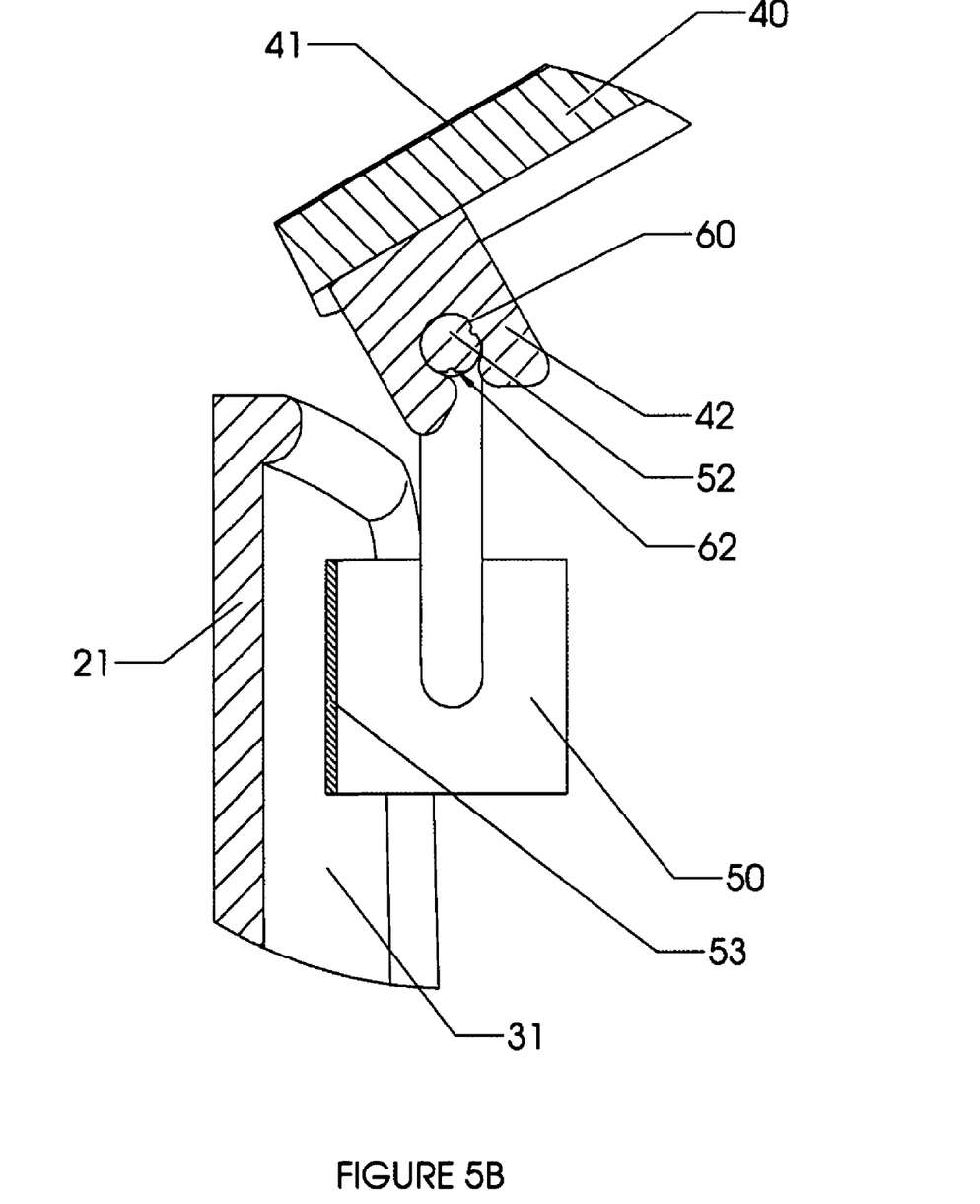
FIG. 5B is a detailed cross-sectional view of the first embodiment flip-up convex mirror attachment hinge assembly with the convex mirror in the non-use position while attached to the OEM mirror.

FIG. 5B illustrates the flip-up convex mirror being maintained in the UP or non-use position by the hinge pin groove 62 and the hinge socket detent 63. The hinge socket material and design is such that the driver must rotate the flip-up convex mirror with sufficient force to cause the sides of the first hinge socket 42 to be deflected and the detent 63 to be disengaged from the grooves 60 or 62 and thereby allowing rotation about the hinge pin 52.

Figure 5C:
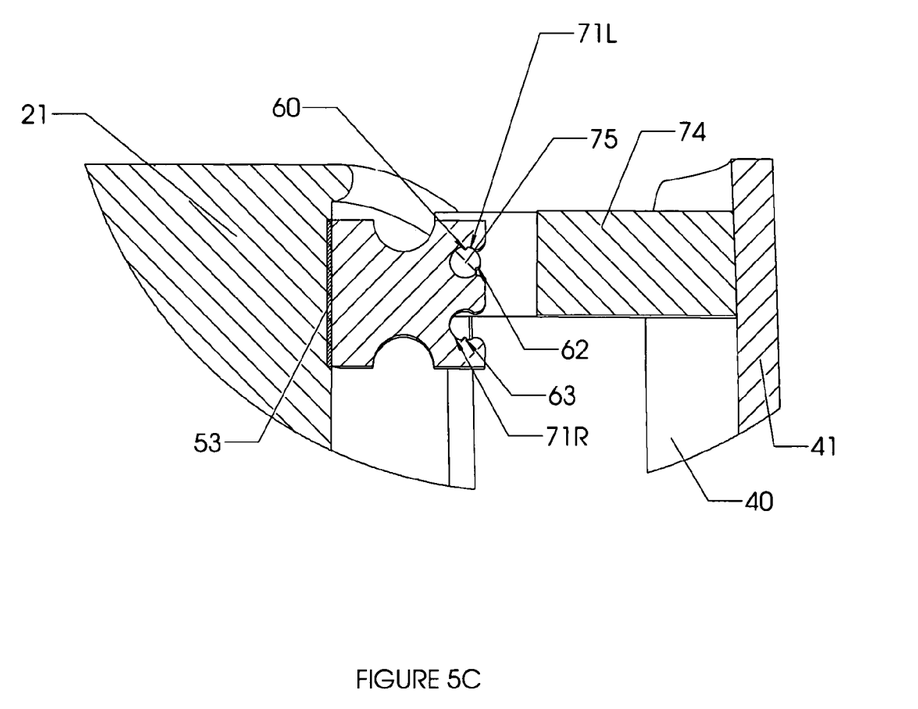
FIG. 5C is a detailed cross-sectional view of the second embodiment flip-up convex mirror attachment hinge assembly with the convex mirror in the in-use position while attached to the OEM mirror.

FIG. 5C illustrates another embodiment to the hinge design and attachment to the flip-up convex mirror. In this embodiment, the wedge block 70 with upper and lower hinge sockets 71L and 71R respectively is attached to the flat OEM mirror 31 by adhesive or double-sided tape 53 as previously described. The opposing side of the wedge block contains an upper and a lower hinge socket 71L and 71R respectively at the predefined convex mirror offset angle C. The upper hinge socket 71L is used when attaching the hinge block 70 to the OEM mirror for use with a left-side driven vehicle as shown in FIG. 5C, while the lower hinge pin 71R is used when attaching the hinge block to the OEM mirror for use with a right-side driven vehicle. When using the lower hinge pin 71R, the hinge block 70 must be rotated 180 degrees before attaching the wedge block to the surface of the OEM mirror 40. By rotating the wedge block 70, the convex mirror offset angle is reversed.

A hinge pin block 74 is attached to or molded into the rear of the flip-up convex mirror 40 and snapped into the upper or lower hinge socket 71L or 71R on the hinge block 70.

Figure 6:
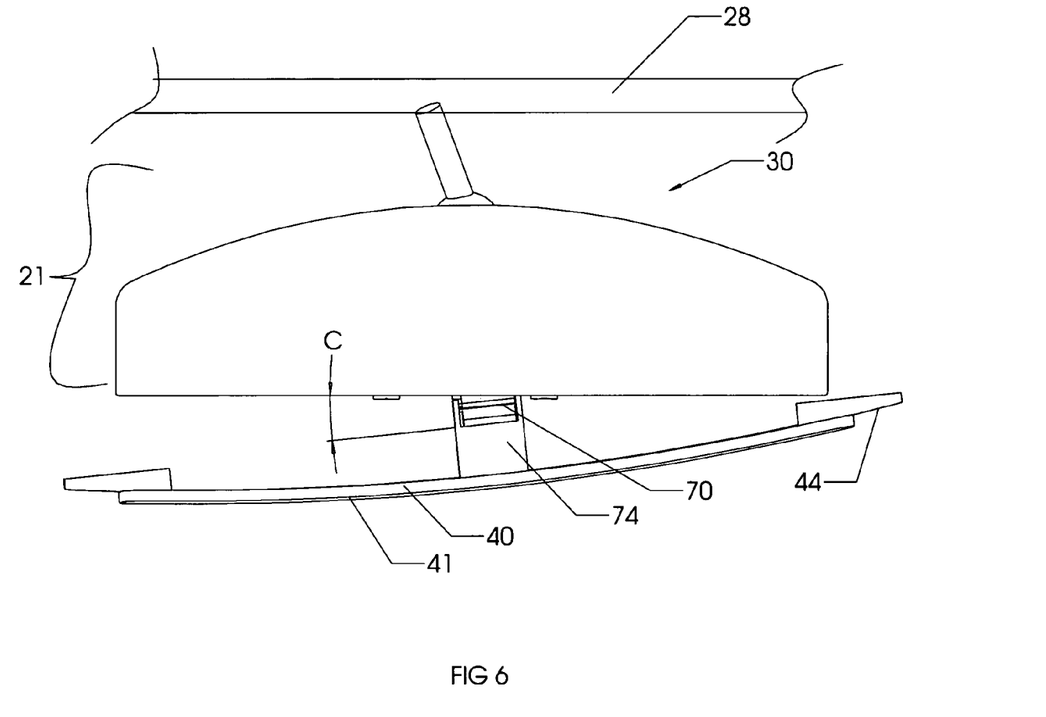
FIG. 6 is a top view of the second embodiment flip-up convex mirror attachment installed onto the original equipment interior rear view mirror typically mounted to the windshield with the driver on the left side of the vehicle.

Now referring to FIG. 6, a top view of the alternative embodiment is shown illustrating the wedge block with upper and lower hinge sockets 70 attached to the flat OEM mirror 31 and also illustrates the flip-up convex mirror 40 offset angle C relative to the surface of the OEM mirror 31. It should be clear that the wedge block and hinge mechanism may be positioned along the upper horizontal surface of the OEM mirror while still maintaining the flip-up convex mirror 40 at the desired offset angle C. It should also be noted that the configuration shown is for a left-side driven vehicle as the offset angle maintains the same image point reflected in the left side of the OEM or convex mirrors when the driver is sitting on the left side of the vehicle. It should also be clear that by rotating the hinged wedge block 180-degrees and attaching to the OEM mirror surface that the flip-up convex mirror 40 offset angle C is reversed for a right-side driven vehicle.

Figure 7:
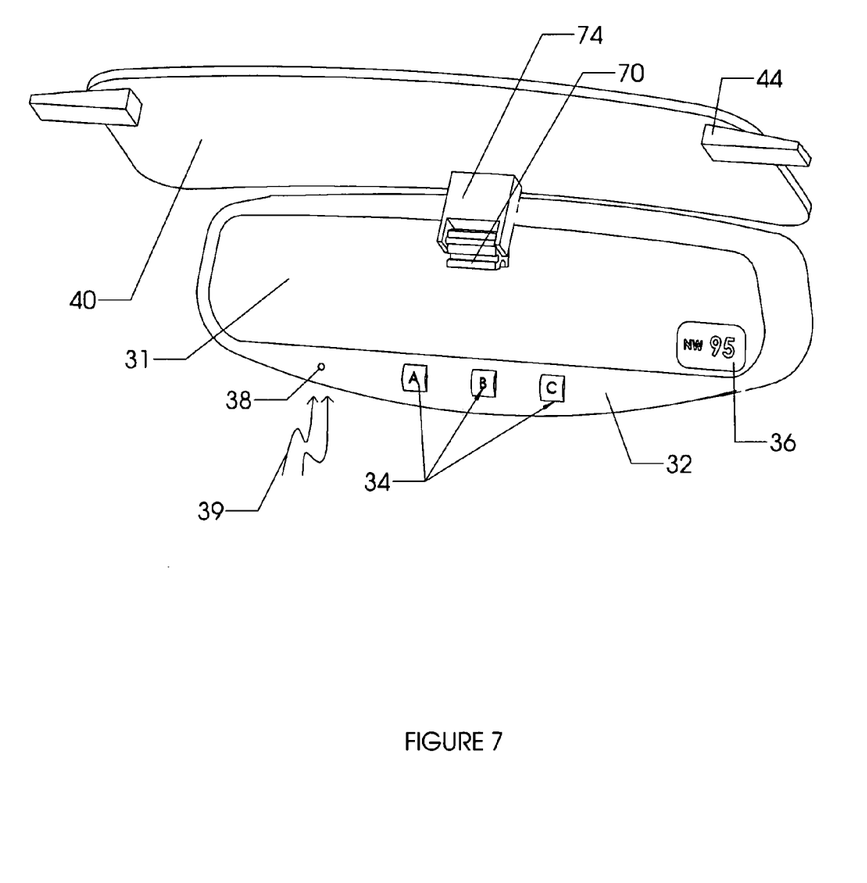
FIG. 7 is a driver's view of the second embodiment flip-up convex mirror attachment with the convex mirror in the non-use position.

FIG. 7 illustrates the alternative embodiment with the flip-up convex mirror in the non-use or UP position. The wedge block 70 with upper and lower hinge sockets 71L and 71R connects to a hinge pin block 74 creating a means to allow rotation about the upper horizontal edge of the OEM mirror while also providing for predetermined rotational stops in the UP and DOWN positions. The upper and lower hinge sockets 71L and 71R are offset from the opposing surface of the wedge block which attaches to the OEM mirror surface by the offset angle C. Numerous methods are known and used within the industry to create predefined rotational stops in hinged parts and need not be fully described here. The designs shown in FIGS. 5A, 5B, and 5C are such an example of a means to create predefined rotational stops and should not be considered as the only means of implementing such predefined stops.

Figure 8:
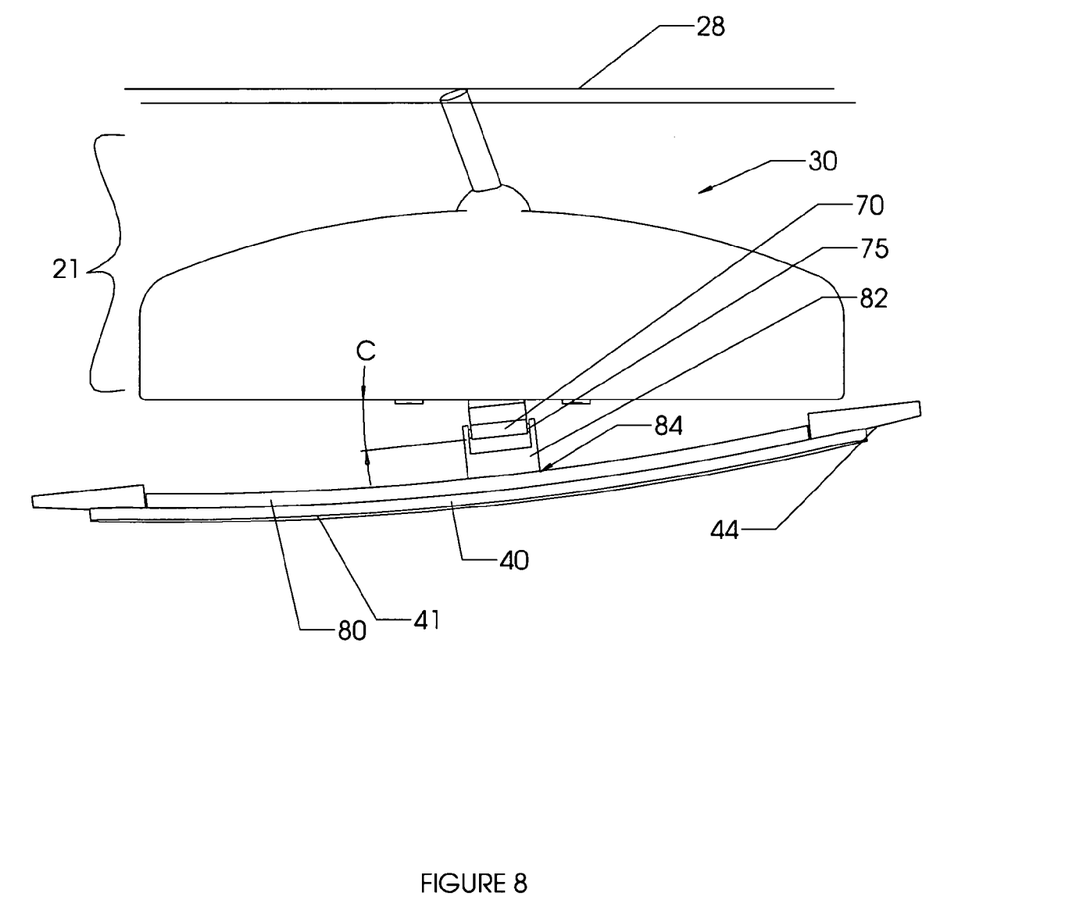
FIG. 8 is a top view of the third embodiment flip-up convex mirror attachment installed onto the original equipment interior rear view mirror typically mounted to the windshield with the driver on the left side of the vehicle and showing a rotatably sliding mechanism for allowing the operator to make slight adjustments to the reflected image angle of the convex mirror to compensate for variations in vehicle design and driver placement within the vehicle.

FIG. 8 illustrates a third embodiment using a wedge block 70 with upper and lower hinge sockets 71L and 71R connected to a sliding hinge pin block 82 with a first side containing a hinge pin 75 and an opposite second side containing a sliding socket 84. In this embodiment, the wedge block 70 is attached to the flat OEM mirror 31 by adhesive or double-sided tape 53 as previously described. The opposing side of the wedge block contains an upper and a lower hinge socket 71L and 71R respectively at the predefined convex mirror offset angle C. The upper hinge socket 71L is used when attaching a hinge block 70 to the OEM mirror for use with a left-side driven vehicle, while the lower hinge socket 71R is used when attaching the hinge block to the OEM mirror for use with a right-side driven vehicle. When using the lower hinge socket, the hinge block must be rotated 180 degrees before attaching the wedge block to the OEM mirror surface. By rotating the wedge block 70, the convex mirror offset angle is reversed.

The first side of the sliding hinge pin block 82 consists of a hinge pin for mating with either the upper or lower hinge socket of the wedge block 70 and a second side with a sliding socket 84 for engagement onto a slide rail 80 attached or molded to the rear of the flip-up convex mirror 40. The slide rail 80 has the same radius D as the convex mirror 40. The sliding socket 84 mates onto the slide rail 80 and allows the sliding hinge pin block 82 to be positioned along the slide rail at an infinite number of positions. The mating surfaces between the sliding socket 84 and the slide rail 80 comprise a friction fit and require the driver 22 to push with sufficient force to move the sliding socket 84 along the slide rail 80. Once the sliding socket 84 is in the desired positioned, the friction fit between these parts will prevent the flip-up convex mirror 40 from moving along the slide rail 80.

This sliding motion rotates the flip-up convex mirror relative to the driver thereby changing the incident angle or reflected light on the side of the mirror nearest the driver. By rotating the flip-up convex mirror away from the driver, the reflected image is moved towards the passenger side of the vehicle. The sliding motion allows the driver to make minor adjustments to the convex mirror offset angle C. The minor adjustments are needed to compensate for changes in the distance and angle between the driver and interior rear view mirror.

It should be noted that the driver may slide the flip-up convex mirror to the extreme edge of the slide. By doing so, the driver may be able to use the flip-up convex mirror in the DOWN position for a wider-angle view while also using an exposed portion of the flat OEM mirror for a normal view. It should also be noted that the driver may also slide the flip-up convex mirror to a position where the reflected image at the point where the OEM and convex mirrors meet will create a transitional image from a normal image to a wide-angle image at a point behind the vehicle.

It should be recognized that the above-described embodiments of the invention are intended to be illustrative only. A latitude of modification, change, and substitution is intended in the foregoing disclosure, and in some instances, some features of the invention will be employed without a corresponding use of other features.

The invention claimed is:

1. A flip-up convex mirror attachment for use on a motor vehicle Original Equipment Manufacturer (OEM) mirror with steering on either the left-hand or right-hand side of the vehicle comprising:

a convex mirror having a reflective convex mirror surface (41) and a first and second hinge socket on the opposing surface of the convex mirror, a wedge block having a flat surface for attaching the wedge block to the mirrored surface of the OEM mirror and a hinge pin on the opposing side of the wedge block, a means for attaching the flat surface of the wedge block to the upper right portion of the mirrored surface of the OEM mirror, wherein the hinge pin on the wedge block is inserted into the first hinge socket on the convex mirror to form a hinge for rotation of the convex mirror about the upper horizontal edge of the OEM mirror thereby allowing the motor vehicle operator sitting on the left-hand side of the vehicle to select between the reflected image of the OEM mirror or the convex mirror.

2. A flip-up convex mirror attachment for use on a motor vehicle OEM mirror with steering on either the left-hand or right-hand side of the vehicle as defined in claim 1 wherein, the wedge block defines an angle between the relative surface planes defined by the OEM and convex mirror surfaces (41) such that the OEM and convex mirrors reflect the same image in the edge of the mirror closest to the driver when either the OEM mirror or the convex mirror is in use.

3. A flip-up convex mirror attachment for use on a motor vehicle OEM mirror with steering on either the left-hand or right-hand side of the vehicle as defined in claim 2 wherein, the hinge rotates between predefined rotational stops allowing the motor vehicle operator to easily and consistently move the convex mirror between the UP position for viewing a reflected image using the OEM mirror or the DOWN position for viewing a wider angle reflected image using the convex mirror.

4. A flip-up convex mirror attachment for use on a motor vehicle OEM mirror with steering on either the left-hand or right-hand side of the vehicle as defined in claim 3 wherein, the predefined angle of the wedge block provides a means for the motor vehicle driver to adjust the OEM and convex mirror assembly to a desired position while viewing the reflected image from either mirror while knowing that the reflected image from the other mirror will maintain the same reflected image on the side of the mirror nearest the driver.

5. A flip-up convex mirror attachment for use on a motor vehicle Original Equipment Manufacturer (OEM) mirror with steering on either the left-hand or right-hand side of the vehicle comprising:
a convex mirror having a reflective convex mirror surface (41) and a hinge pin on the opposing surface of the convex mirror,
a wedge block having a flat surface for attaching the wedge block to the mirrored surface of the OEM mirror and a first and a second hinge socket on the opposing side of the wedge block,
a means for attaching the flat surface of the wedge block to the upper right portion of the mirrored surface of the OEM mirror,
wherein the hinge pin on the convex mirror is connected to the first hinge socket on the wedge block to form a hinge for rotation of the convex mirror about the upper horizontal edge of the OEM mirror thereby allowing the motor vehicle operator sitting on the left-hand side of the vehicle to select between the reflected image of the OEM mirror or the convex mirror.

6. A flip-up convex mirror attachment for use on a motor vehicle OEM mirror with steering on either the left-hand or right-hand side of the vehicle as defined in claim 5 wherein, the hinge defines an angle between the relative surface planes defined by the OEM and convex mirror surfaces such that the OEM and convex mirrors reflect the same image in the edge of the mirror closest to the driver when either the OEM mirror or the convex mirror is in use.

7. A flip-up convex mirror attachment for use on a motor vehicle OEM mirror with steering on either the left-hand or right-hand side of the vehicle as defined in claim 6 wherein, the hinge rotates between predefined rotational stops allowing the motor vehicle operator to easily and consistently move the convex mirror between the UP position for viewing a reflected image using the OEM mirror or the DOWN position for viewing a wider angle reflected image using the convex mirror.

8. A flip-up convex mirror attachment for use on a motor vehicle Original Equipment Manufacturer (OEM) mirror with steering on either the left-hand or right-hand side of the vehicle comprising:
a convex mirror having a reflective convex mirror surface (41) and a sliding rail on the opposing surface of the convex mirror,
a wedge block having a flat surface for attaching the wedge block to the mirrored surface of the OEM mirror and a first and second hinge socket on the opposing side of the wedge block,
a sliding hinge pin block having a hinge pin for connecting the sliding hinge pin block to the first hinge socket on the wedge block and a sliding socket on the opposing side of the sliding hinge pin block for attaching to the sliding rail on the convex mirror,
a means for attaching the flat surface of the wedge block to the upper right portion of the mirrored surface of the OEM mirror,
wherein the sliding socket on the sliding hinge pin block is connected to the sliding rail on the convex mirror for lateral adjustments of the convex mirror relative to the OEM mirror,
wherein the hinge pin on the sliding hinge pin block is connected to the first hinge socket on the wedge block to form a hinge for rotation of the convex mirror about the upper horizontal edge of the OEM mirror thereby allowing the motor vehicle operator sitting on the left-hand side of the vehicle to select between the reflected image of the OEM mirror or the convex mirror.

9. A flip-up convex mirror attachment for use on a motor vehicle OEM mirror with steering on either the left-hand or right-hand side of the vehicle as defined in claim 8 wherein, the upper and lower hinge sockets of the wedge block define an angle between the relative surface planes defined by the OEM and convex mirror surfaces such that the OEM and convex mirrors reflect the same image in the edge of the mirror closest to the driver when either the OEM mirror or the convex mirror is in use.

10. A flip-up convex mirror attachment for use on a motor vehicle OEM mirror with steering on either the left-hand or right-hand side of the vehicle as defined in claim 9 wherein, the hinge rotates between predefined rotational stops allowing the motor vehicle operator to easily and consistently move the convex mirror between the UP position for viewing a reflected image using the OEM mirror or the DOWN position for viewing a wider angle reflected image using the convex mirror.

* * * * *